US011623765B2

(12) United States Patent
Hotta

(10) Patent No.: US 11,623,765 B2
(45) Date of Patent: Apr. 11, 2023

(54) INFORMATION PROCESSING DEVICE, STORAGE MEDIUM, INFORMATION PROCESSING SYSTEM, AND A MOBILE TERMINAL DEVICE

(71) Applicants: Kabushiki Kaisha Toshiba, Tokyo (JP); Toshiba Digital Solutions Corporation, Kawasaki (JP)

(72) Inventor: Tomoyuki Hotta, Machida (JP)

(73) Assignees: KABUSHIKI KAISHA TOSHIBA, Tokyo (JP); TOSHIBA DIGITAL SOLUTIONS CORPORATION, Kawasaki (JP)

(*) Notice: Subject to any disclaimer, the term of this patent is extended or adjusted under 35 U.S.C. 154(b) by 196 days.

(21) Appl. No.: 17/145,557

(22) Filed: Jan. 11, 2021

(65) Prior Publication Data

US 2021/0221535 A1 Jul. 22, 2021

(30) Foreign Application Priority Data

Jan. 21, 2020 (JP) .............................. JP2020-007722

(51) Int. Cl.
*B64F 1/36* (2017.01)
*B64F 1/32* (2006.01)
(Continued)

(52) U.S. Cl.
CPC .............. *B64F 1/368* (2013.01); *B64F 1/324* (2020.01); *B64F 1/326* (2020.01);
(Continued)

(58) Field of Classification Search
CPC .. B64F 1/36; B64F 1/326; B64F 1/324; B64F 1/368; G06T 7/73; G02B 27/0172
(Continued)

(56) References Cited

U.S. PATENT DOCUMENTS 8,301,296 B2 * 10/2012 Grundmann ........... G06Q 50/28
700/229
9,129,167 B2 * 9/2015 Motley, III ........ G06K 7/10366
(Continued)

FOREIGN PATENT DOCUMENTS

JP   2015-036800 A   2/2015
JP   2017-027569 A   2/2017
(Continued)

*Primary Examiner* — Douglas A Hess
(74) *Attorney, Agent, or Firm* — Maier & Maier, PLLC

(57) ABSTRACT

An information processing device includes an association information acquiring unit, a first position information acquiring unit, and an output control unit. The association information acquiring unit acquires association information in which first identification information used for identifying baggage and second identification information used for identifying an owner of baggage identified by the first identification information are associated with each other. The first position information acquiring unit acquires position information of target baggage that is baggage identified by the first identification information included in the association information. The output control unit causes a mobile terminal held by a target owner who is an owner of the baggage identified by the second identification information associated with the first identification information relating to the target baggage in the association information to output information based on the position information of the target baggage.

14 Claims, 17 Drawing Sheets

(51) Int. Cl.
  *G06T 7/73* (2017.01)
  *G02B 27/01* (2006.01)

(52) U.S. Cl.
  CPC ............ *G02B 27/0172* (2013.01); *G06T 7/73* (2017.01); *G06T 2207/30112* (2013.01)

(58) Field of Classification Search
  USPC ............................ 198/358; 340/572.1, 568.1
  See application file for complete search history.

(56) References Cited

U.S. PATENT DOCUMENTS

| | | | |
|---|---|---|---|
| 9,315,278 B2* | 4/2016 | Song | B65G 43/08 |
| 9,398,795 B2* | 7/2016 | Gupta | A45C 13/18 |
| 9,457,917 B2* | 10/2016 | Dadyala | B64F 1/368 |
| 10,552,927 B2* | 2/2020 | Dange | G06Q 50/14 |
| 10,745,150 B2* | 8/2020 | Lykkegaard | B64F 1/368 |
| 10,776,593 B1* | 9/2020 | Verma | G06Q 10/0631 |
| 10,977,782 B2* | 4/2021 | Piegay | G06K 7/1413 |
| 11,087,101 B2* | 8/2021 | Hale | G06K 19/07767 |
| 11,463,576 B1* | 10/2022 | Gordon | H04M 1/72448 |
| 2009/0315704 A1* | 12/2009 | Rosing et al. | |
| 2022/0406068 A1* | 12/2022 | Kawase et al. | |

FOREIGN PATENT DOCUMENTS

| JP | WO2017/175267 A1 | 10/2017 |
|---|---|---|
| JP | 2019-117513 A | 7/2019 |

\* cited by examiner

| FIRST IDENTIFICATION INFORMATION (BAGGAGE IDENTIFICATION INFORMATION) | SECOND IDENTIFICATION INFORMATION (OWNER IDENTIFICATION INFORMATION) | ... |
|---|---|---|
| B0001 | P0001 | ... |
| B0002 | P0002 | ... |
| B0003 | P0003 | ... |
| B0004 | P0004 | ... |
| ... | ... | ... |

| FIRST IDENTIFICATION INFORMATION (BAGGAGE IDENTIFICATION INFORMATION) | | SECOND IDENTIFICATION INFORMATION (OWNER IDENTIFICATION INFORMATION) | ... |
|---|---|---|---|
| B0001 | - | P0001 | ... |
| B0002-1 | B0002-2 | P0002 | ... |
| B0003 | - | P0003 | ... |
| B0004 | - | P0004 | ... |
| ... | | ... | ... |

IC1

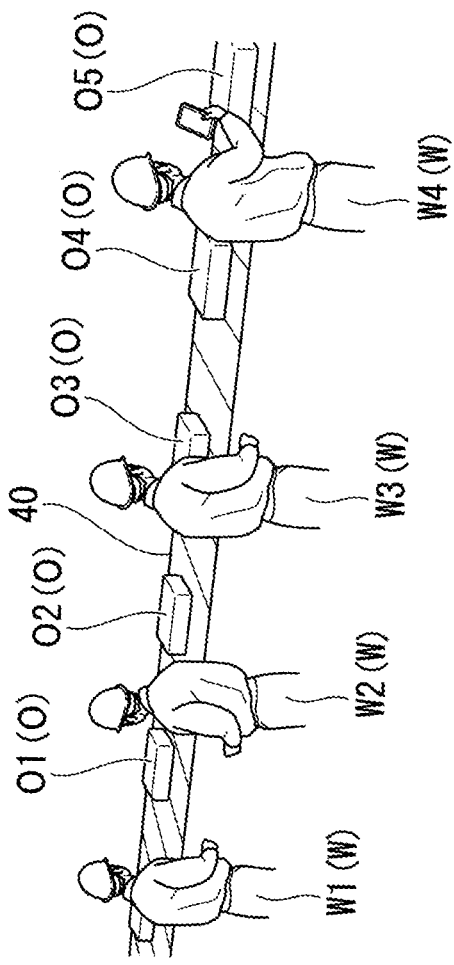
FIG. 16B
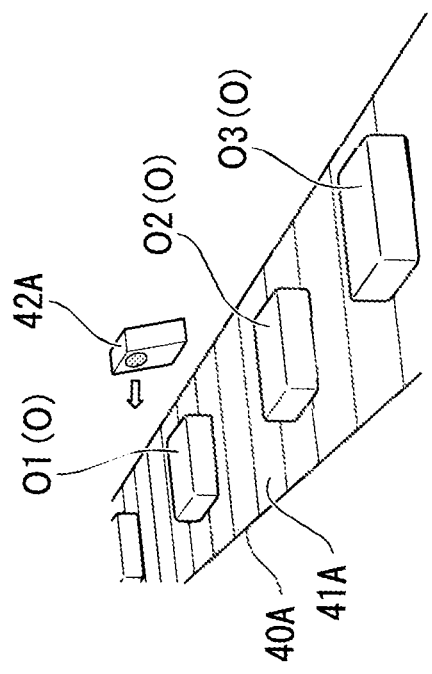
FIG. 16A
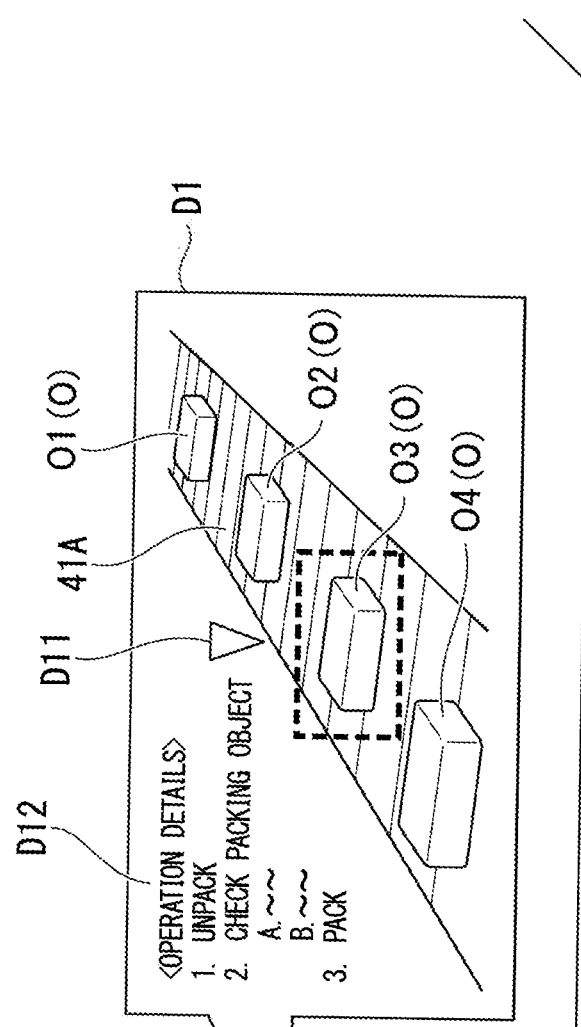
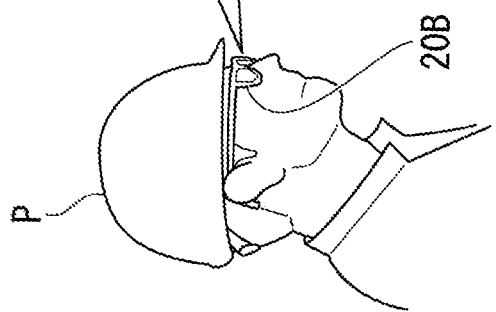
FIG. 16C

| FIRST IDENTIFICATION INFORMATION (BAGGAGE IDENTIFICATION INFORMATION) | SECOND IDENTIFICATION INFORMATION (OWNER IDENTIFICATION INFORMATION) | | ... |
|---|---|---|---|
| B0001 | P0001 | - | ... |
| B0002 | P0002 | P0002-2 | ... |
| B0003 | P0003 | - | ... |
| B0004 | P0004 | - | ... |
| ... | ... | ... | ... |

IC2

INFORMATION PROCESSING DEVICE, STORAGE MEDIUM, INFORMATION PROCESSING SYSTEM, AND A MOBILE TERMINAL DEVICE

CROSS-REFERENCE TO RELATED APPLICATION

This application is based upon and claims the benefit of priority from Japanese Patent Application No. 2020-007722, filed Jan. 21, 2020; the entire contents of which are incorporated herein by reference.

FIELD

Embodiments of the present invention relate to an information processing device, a program, an information processing system, and a mobile terminal device.

BACKGROUND

Conventionally, in a system in which an owner of baggage receives his or her baggage among a plurality of piece of baggage that are being conveyed, there is a problem of mistaking another person's baggage for the owner's baggage. In order to solve such a problem, there are technologies for notifying an owner of a conveying status of his or her baggage by identifying baggage and the owners of the baggage and projecting images onto baggage that is being conveyed using a projector.

In a case in which such technologies are used, until an owner of baggage approaches the baggage, an image indicating his or her baggage is not projected. In addition, in a case in which there are many persons near baggage that is being conveyed, images are projected onto many pieces of baggage, and thus, there is a problem in that the distinguishability deteriorates. In other words, according to conventional technology, there is a problem in that the distinguishability deteriorates in a case in which many persons are looking for baggage.

An object of the present invention is to provide an information processing device, a program, an information processing system, and a mobile terminal device capable of supporting a person receiving his or her baggage among a plurality of pieces of baggage that are being conveyed.

BRIEF DESCRIPTION OF THE DRAWINGS

FIG. 13 is a diagram illustrating a modified example of association information according to this embodiment.

FIGS. 16A to 16C are diagrams illustrating examples of a case in which an information processing system according to this embodiment is applied to a belt conveyer operation of a distribution industry or the like.

DETAILED DESCRIPTION

An information processing device according to an embodiment includes an association information acquiring unit, a first position information acquiring unit, and an output control unit. The association information acquiring unit acquires association information in which first identification information used for identifying baggage and second identification information used for identifying an owner of baggage identified by the first identification information are associated with each other. The first position information acquiring unit acquires position information of target baggage that is baggage identified by the first identification information included in the association information. The output control unit causes a mobile terminal held by a target owner who is an owner of the baggage identified by the second identification information associated with the first identification information relating to the target baggage in the association information to output information based on the position information of the target baggage.

Hereinafter, an information processing device, a program, an information processing system, and a mobile terminal device according to embodiments will be described with reference to the drawings.

[Configuration of Information Processing System 1]

Figure 1:
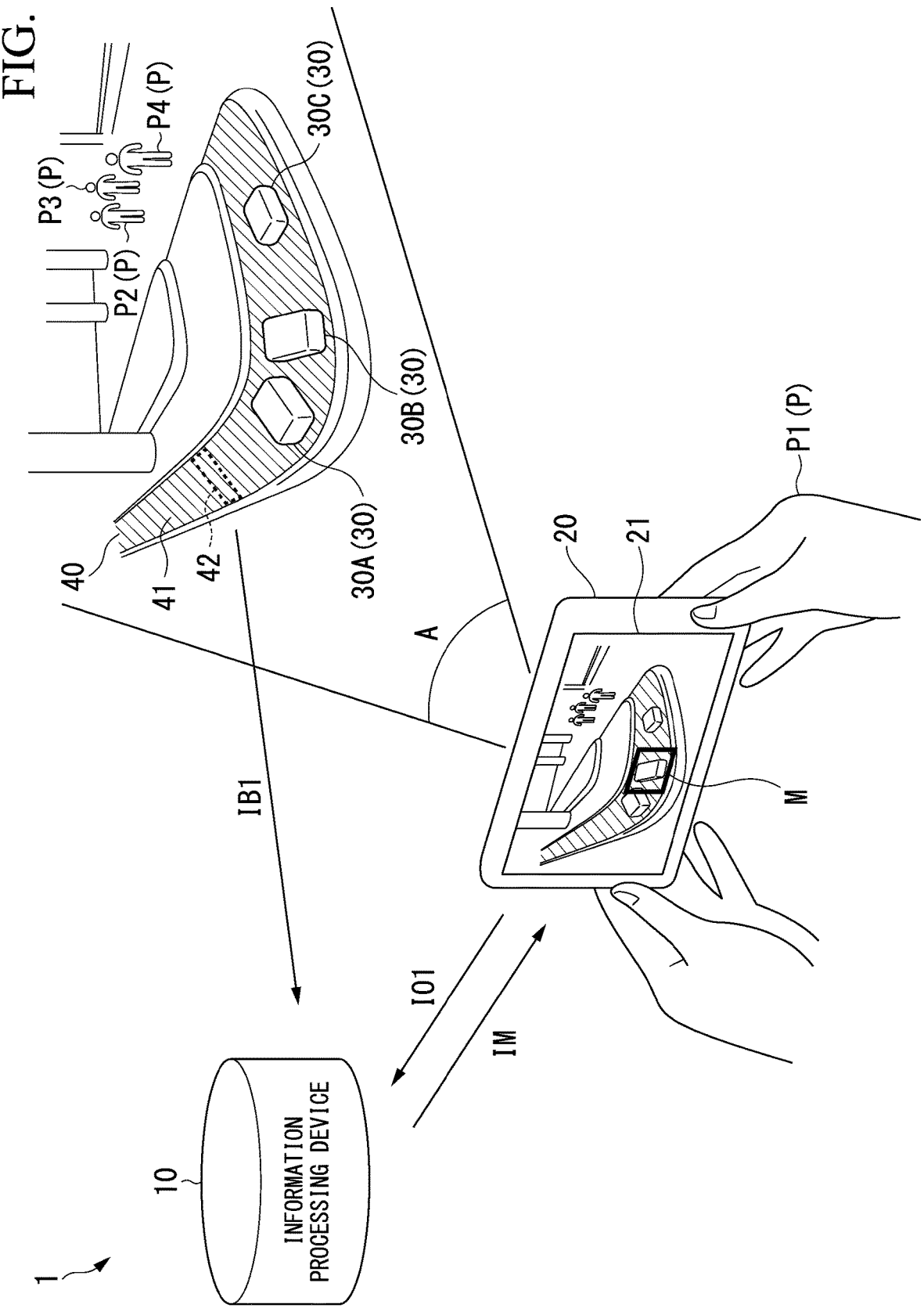
FIG. 1 is a diagram illustrating an example of an information processing system according to this embodiment.

FIG. 1 is a diagram illustrating an example of the configuration and the usage environment of an information processing system 1 according to this embodiment. The information processing system 1, for example, includes an information processing device 10 and a mobile terminal 20. The information processing system 1 is used in an occasion in which an owner of baggage searches for his or her baggage among a plurality of pieces of baggage and receives his or her baggage that is found. The plurality of pieces of baggage may be being conveyed by a conveying device or may be placed at a predetermined place. The information processing system 1, for example, is used at a baggage claim of an airport. A baggage conveying device 40 is installed at a baggage claim of an airport.

The baggage conveying device 40 includes a baggage conveying belt 41. The baggage conveying belt 41 conveys a plurality of pieces of baggage 30 at a predetermined conveying speed. An owner of baggage 30 (hereinafter, referred to as an owner P) searches for his or her baggage among a plurality of pieces of baggage that are being conveyed by the baggage conveying belt 41 and receives his or her baggage that has been found. In the example illustrated in FIG. 1, the baggage conveying belt 41 included in the baggage conveying device 40 is conveying baggage 30A, baggage 30B, and baggage 30C. Around the baggage conveying device 40, a plurality of owners P1 to P4 gathers to search for baggage 30. The baggage conveying device 40 may include an identification information reading device 42.

For example, the identification information reading device 42 is attached to a fixing part of the baggage conveying device 40. Unique baggage identification information is assigned to baggage 30, and the identification information reading device 42 acquires baggage identification information assigned to the baggage 30 passing through the surroundings thereof. For example, the baggage identification information assigned to the baggage 30 is stored in a radio frequency identifier (RFID) tag or is displayed in the form of a barcode, a two-dimensional code, or the like (hereinafter, referred to as an RFID tag or the like). Thus, the identification information reading device 42 may be a reading device such as an RFID reader or an optical reading device such as a barcode reader.

The baggage conveying device 40 detects a position of baggage 30 and transmits the detected position information of the baggage 30 to the information processing device 10 as position information IB1. For example, the position information IB1 of baggage 30 is calculated using a time at which the identification information reading device 42 reads baggage identification information assigned to the baggage 30, a current time (a calculation time point), and a conveying speed of the baggage conveying belt 41. The position information IB1 of baggage 30 may be acquired by performing image analysis on an image captured by an imaging device, which is not illustrated in the drawing, included in the baggage conveying device 40.

The information processing device 10 acquires the position information IB1 of baggage 30 conveyed by the baggage conveying device 40 as described above and performs a process described below.

The information processing device 10 acquires position information IO1 of the mobile terminal 20. The mobile terminal 20 acquires position information thereof using a GPS or the like and transmits the acquired position information IO1 to the information processing device 10.

The information processing device 10 transmits instruction information IM that is information based on the acquired position information IB1 of the baggage and the position information IO1 of the owner to the mobile terminal 20. The instruction information IM is information that is used for causing the mobile terminal 20 to display the position of baggage 30 owned by the owner P. The information used for causing the mobile terminal 20 to display the position of baggage 30 owned by the owner P may be either spatial coordinates or a web page.

The mobile terminal 20 is a terminal that is held by the owner P. The mobile terminal 20 includes a display unit 21. The display unit 21 displays the position of the baggage 30 of the owner P.

The mobile terminal 20, for example, is a smartphone or a tablet terminal. For example, in a case in which the mobile terminal 20 includes an imaging unit, the display unit 21 may display the position of the baggage 30 on the basis of the spatial coordinates represented in the instruction information IM being superimposed on an image captured by the mobile terminal 20. The mobile terminal 20 acquires posture information thereof using a G sensor, a GPS, or the like and detects a spatial direction in which an optical axis thereof is directed. The mobile terminal 20 calculates a position of the spatial coordinates acquired from the information processing device 10 with respect to the optical axis thereof, converts the position into a position in a camera image space, and performs AR display. In a case in which the mobile terminal 20 operates a browser or a web application, the mobile terminal 20 may display the position of the baggage 30 using a web page.

In the example illustrated in FIG. 1, the imaging unit included in the mobile terminal 20 images the baggage conveying device 40 with an image angle A and displays the position of the baggage 30 owned by the owner P1 as instruction information M being superimposed on the image acquired by imaging the baggage conveying device 40.

[Functional Configuration of Information Processing Device 10]

Figure 2:
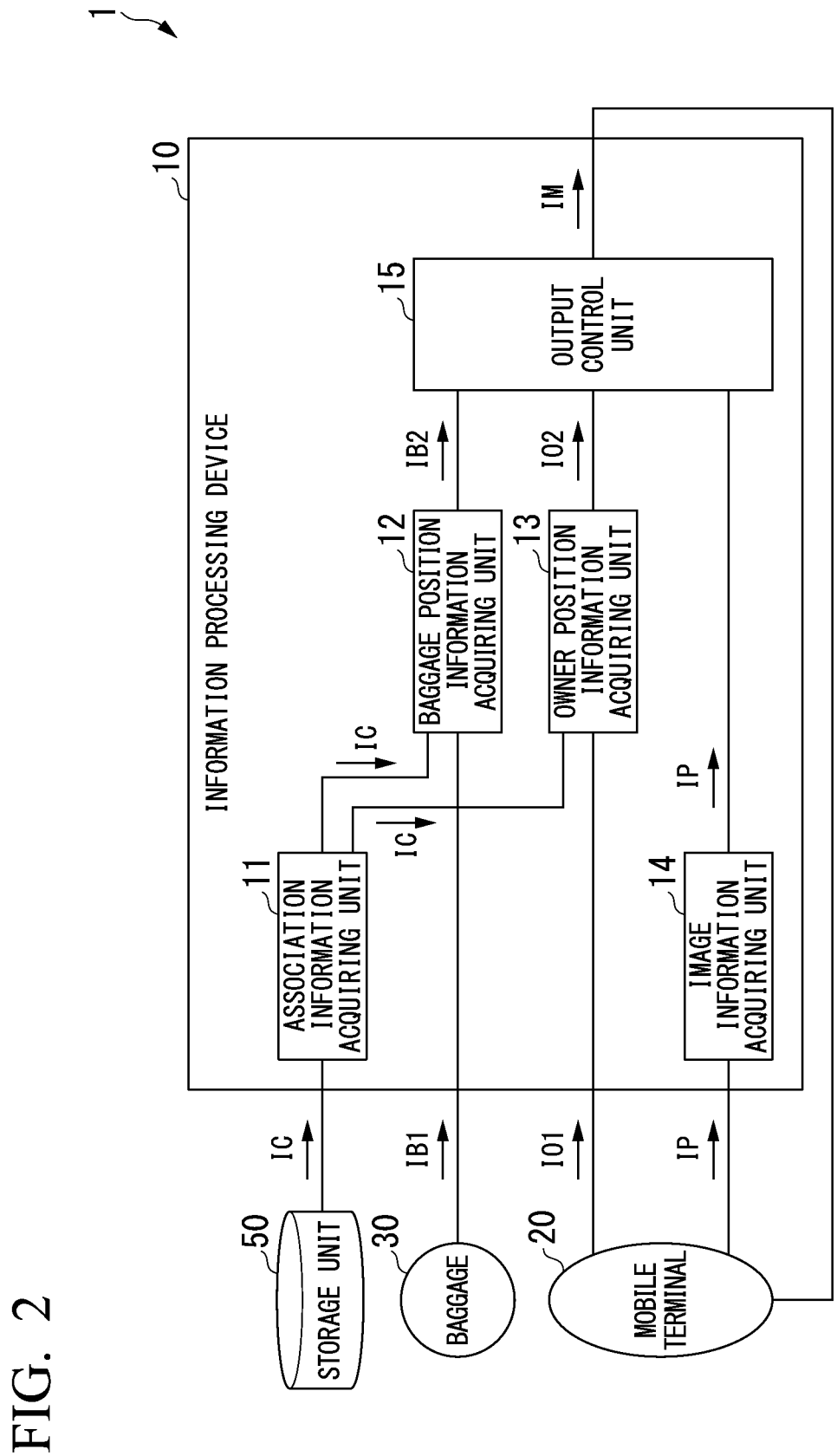
FIG. 2 is a diagram illustrating an example of the functional configuration of the information processing device according to this embodiment.

FIG. 2 is a diagram illustrating an example of the functional configuration of the information processing device 10 according to this embodiment. An example of the functional configuration of the information processing device 10 will be described with reference to the drawing. For example, the information processing device 10 includes an association information acquiring unit 11, a baggage position information acquiring unit (a first position information acquiring unit) 12, an owner position information acquiring unit (a second position information acquiring unit) 13, an image information acquiring unit 14, and an output control unit 15.

For example, such components are realized by a hardware processor such as a central processing unit (CPU) executing a program (software). Some or all of such components may be realized by hardware (a circuit unit; including circuitry) such as a large scale integration (LSI), an application specific integrated circuit (ASIC), a field-programmable gate array (FPGA), a graphics processing unit (GPU) and the like or may be realized by software and hardware in cooperation. The program may be stored in a storage device (a storage device including a non-transitory storage medium) such as a hard disk drive (HDD) or a flash memory in advance or may be stored in an attachable/detachable storage medium (a non-transitory storage medium) such as a DVD or a CD-ROM and be installed by loading the storage medium into a drive device.

The association information acquiring unit 11 acquires association information IC from a storage unit 50. The association information IC is information in which baggage identification information (first identification information) used for identifying baggage 30 and owner identification information (second identification information) used for identifying an owner P of the baggage 30 identified using the baggage identification information are associated with each other. For example, the association information IC stored in the storage unit 50 is updated by a baggage keeping device installed at a baggage storage of an airport. For example, the storage unit 50 is realized by a storage device (a network attached storage (NAS)) that is built into the baggage keeping device or is accessed through a network. The association information acquiring unit 11 may directly access the storage unit 50 that is a NAS, acquire association information IC by requesting it from a device that manages the storage unit 50, or acquire association information IC from a device that manages the storage unit 50 in the form of a push notification, an electronic mail, or the like.

Figures 3, 4:
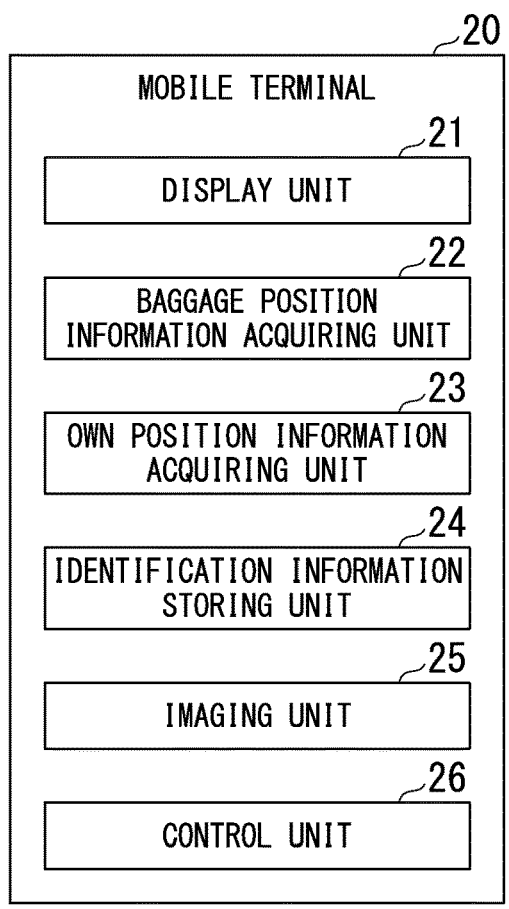
FIG. 3 is a diagram illustrating an example of association information according to this embodiment.
FIG. 4 is a diagram illustrating an example of the functional configuration of a mobile terminal according to this embodiment.

FIG. 3 is a diagram illustrating an example of association the information IC according to this embodiment. As illustrated in the drawing, the association information IC is information in which the baggage identification information and the owner identification information are associated with each other. In the example illustrated in the drawing, the baggage identification information "B0001" and the owner identification information "P0001", the baggage identification information "B0002" and the owner identification information "P0002", the baggage identification information "B0003" and the owner identification information "P0003", and the baggage identification information "B0004" and the owner identification information "P0004" are associated with each other.

For example, the baggage identification information is assigned when a user leaves baggage 30 at a baggage storage location at a boarding airport. At this time, an RFID tag or the like in which the baggage identification information is stored is attached to baggage 30 using a seal or the like. The baggage identification information may be acquired by performing image analysis on a captured image of the baggage 30.

Regarding an owner P of baggage 30, by providing owner identification information at the time of leaving the baggage 30, the baggage 30 and the owner P are associated with each other. The owner identification information is information that is used for identifying an owner P of baggage 30. For example, the owner identification information is terminal identification information that is used for identifying a mobile terminal 20 held by the owner P of the baggage 30. In the following description, a case in which the owner identification information is the terminal identification information will be described. In the mobile terminal 20, an application for receiving a service of the information processing system 1 operates, and the display unit 21 is caused to display a code such as a QR code (registered trademark) used for causing the application to read terminal identification information. In the baggage storage, a reader device is installed, and terminal identification information read by the reader device is associated with baggage identification information as owner identification information. The association between the owner identification information and the baggage identification information is not limited to this example and may be performed using any other method.

Referring back to FIG. 2, the association information acquiring unit 11 provides the acquired association information IC for the baggage position information acquiring unit 12 and the owner position information acquiring unit 13.

The baggage position information acquiring unit 12, first, extracts one record from the association information IC. Baggage identified by the baggage identification information included in the extracted record will be referred to as target baggage. The baggage position information acquiring unit 12 adds the position information IB1 of target baggage acquired from the baggage conveying device 40 to the baggage identification information of the target baggage, thereby generating baggage information IB2. As a result, the baggage information IB2 is information that includes the position information IB1 of the target baggage included in the association information IC. The baggage position information acquiring unit 12 provides the generated baggage information 1132 for the output control unit 15.

The owner position information acquiring unit 13, first, extracts one record that is the same as that extracted by the baggage position information acquiring unit 12 from the association information IC. An owner identified using owner identification information included in the extracted record will be referred to as a target owner. The owner position information acquiring unit 13 adds position information IO1 of the target owner acquired from the mobile terminal 20 to owner identification information of the target owner, thereby generating owner information IO2. As a result, the owner information IO2 is information that includes the position information IO1 of the target owner included in the association information IC. The owner position information acquiring unit 13 provides the generated owner information IO2 for the output control unit 15 in association with a result of the process performed by the baggage position information acquiring unit 12.

The image information acquiring unit 14 acquires information of an image captured by the imaging unit of the mobile terminal 20 as image information IP. The image information acquiring unit 14 provides the acquired image information IP for the output control unit 15.

The output control unit 15 causes the mobile terminal 20 held by the target owner to output instruction information IM. For example, the output control unit 15 causes the display unit 21 included in the mobile terminal 20 to display the instruction information IM. The instruction information IM is information that represents a position of target baggage owned by a target owner.

More specifically, in a case in which the position information IO1 of a target owner satisfies a predetermined condition, the output control unit 15 causes a mobile terminal 20 held by the target owner to output information based on the position information IB1 of the target baggage. For example, the output control unit 15 transmits image information based on the position information IB1 of the target baggage or information used for generating image information based on the position information IB1 of the target baggage to the mobile terminal 20. The mobile terminal 20 displays the image information acquired from the output control unit 15 or the information used for generating image information. In a case in which a predetermined condition is satisfied, the output control unit 15 may transmit the image information or the information used for generating image information to the mobile terminal 20. The output control unit 15 may transmit the image information or the information used for generating image information to the mobile terminal 20 in real time and transmit a display start signal to the mobile terminal 20 in a case in which a predetermined condition is satisfied.

Here, for example, the predetermined condition is a condition that is based on the position of the baggage 30 of the target owner. More specifically, the predetermined condition may include a condition that a position represented using the position information of the target owner is within a predetermined distance from a baggage pickup location. In addition, the output control unit 15 may cause the mobile terminal 20 held by the target owner to output information based on the position information of the target baggage using a condition that the mobile terminal 20 is being operated by the owner P as the predetermined condition.

[Functional Configuration of Mobile Terminal 20]

FIG. 4 is a diagram illustrating an example of the functional configuration of the mobile terminal 20 according to this embodiment. The example of the functional configuration of the mobile terminal 20 will be described with reference to the drawing. The mobile terminal 20 includes a display unit 21, a baggage position information acquiring unit 22, an own position information acquiring unit 23, an identification information storing unit 24, an imaging unit 25, and a control unit 26.

The baggage position information acquiring unit 22 acquires position information of the baggage 30. In the example of a case in which the information processing system 1 is used at a baggage claim of an airport, the baggage position information acquiring unit 22 acquires position information of baggage 30 from the identification information reading device 42 included in the baggage conveying device 40. The own position information acquiring unit 23 acquires position information of the own device (in other words, the mobile terminal 20). For example, the own position information acquiring unit 23 is a GPS receiver. In a case in which the own position information acquiring unit 23 is a GPS receiver, the own position information acquiring unit 23 acquires position information of the own device from GPS satellites.

For example, the display unit 21 may be a display such as a liquid crystal display or an organic electroluminescence (EL) display. In a case in which the position of the baggage 30 represented in the position information of the baggage 30 acquired by the baggage position information acquiring unit 22 and the position of the own device represented in the position information of the own device acquired by the own position information acquiring unit 23 are within a predetermined range, the display unit 21 displays the position of the baggage 30 represented in the position information of the baggage 30.

The identification information storing unit 24 stores owner identification information. For example, the identification information storing unit 24 may be a non-volatile memory. The imaging unit 25 performs imaging. For example, the imaging unit 25 includes an optical system, an imaging device, and an image processing substrate that processes an imaging signal output from the imaging device and generates and outputs image data of a predetermined format based on the imaging signal. The mobile terminal 20 may be configured to display output image data in the display unit 21. The control unit 26 controls various functions of the mobile terminal 20. Hereinafter, the mobile terminal 20 will also be referred to as a mobile terminal device.

[Flow of Process at Baggage Storage]

Figure 5:
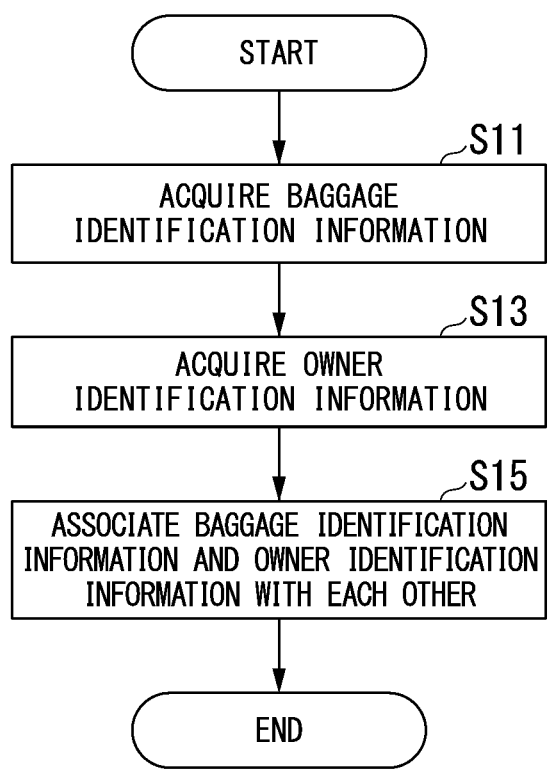
FIG. 5 is a diagram illustrating the flow of the process of acquiring association information according to this embodiment.

FIG. 5 is a diagram illustrating the flow of the process of acquiring association information IC according to this embodiment. In a case in which the information processing system 1 is used at a baggage claim of an airport, the association information IC is acquired at a baggage storage of the airport.

(Step S11)

First, a baggage keeping device not illustrated in the drawing receives baggage 30 from an owner P. When the baggage 30 is received, the baggage keeping device acquires baggage identification information attached to the baggage 30. The baggage identification information may be information used for identifying baggage 30 on the basis of image information of the baggage 30. In such a case, the baggage keeping device acquires baggage identification information by imaging the baggage 30 using an imaging device not illustrated in the drawing. In a case in which the baggage identification information is stored using an RFID tag or the like, the baggage identification information is assigned to the baggage 30 by attaching a seal to which the RFID tag is attached to the baggage 30 in the baggage storage. The baggage keeping device acquires baggage identification information from an RFID tag or the like attached to the baggage.

(Step S13)

When the baggage keeping device receives baggage 30 from an owner P, the baggage keeping device acquires owner identification information of the owner P of the baggage 30. The owner identification information may be information that is used for identifying a mobile terminal 20 held by the owner P. In a case in which the owner identification information is information that is used for identifying a mobile terminal 20 held by the owner P, when an owner P leaves baggage 30 at the baggage storage, the owner identification information may be acquired from a barcode, a two-dimensional core, or the like displayed in the mobile terminal 20 held by the owner P.

In addition, the owner identification information may be information that is based on biometric information of an owner P. For example, the owner identification information may be information that is identified through face recognition based on image information of the owner P. In such a case, the baggage keeping device acquires owner identification information by imaging the owner P using an imaging device.

(Step S15)

The baggage keeping device stores the acquired owner identification information and the baggage identification information as association information IC in the storage unit 50 in association with each other and ends the process.

[Flow of Process at Baggage Claim]

Figure 6:
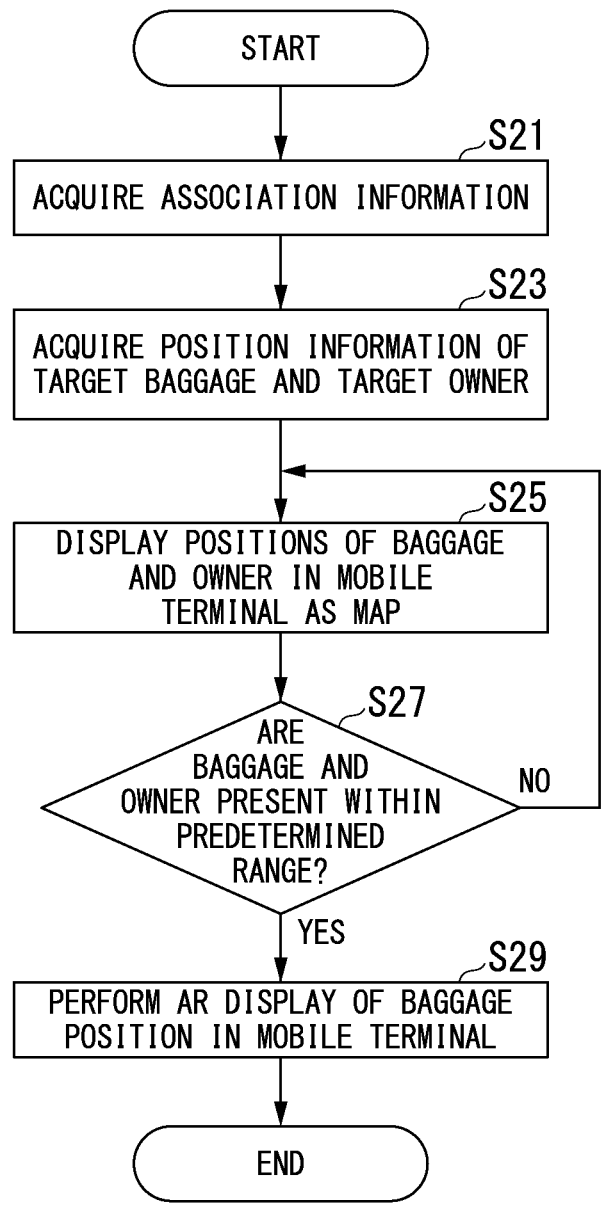
FIG. 6 is a diagram illustrating an example of the flow of a process of the information processing device according to this embodiment.

FIG. 6 is a diagram illustrating an example of the flow of a process of the information processing device 10 according to this embodiment. The flow of the process performed in a case in which the information processing system 1 is used at the baggage claim of an airport will be described with reference to the drawing.

(Step S21)

The association information acquiring unit 11 extracts one record from the association information IC.

(Step S23)

The baggage position information acquiring unit 12 acquires position information IB1 of target baggage represented in the extracted record. The owner position information acquiring unit 13 acquires position information IO1 of the target owner represented in the extracted record.

(Step S25)

The output control unit 15 causes the display unit 21 of the mobile terminal 20 to display the position of the target owner and the position of the target baggage. The output control unit 15 may display a map of the baggage claim of the airport in the display unit 21 and display the position of the target owner and the position of the target baggage. In addition, the output control unit 15 may display distance information calculated from the position of the target owner and the position of the target baggage.

(Step S27)

The output control unit 15 determines whether or not the position of the target owner and the position of the target baggage are within a predetermined range. In a case in which the position of the target owner and the position of the target baggage are within the predetermined range, the output control unit 15 causes the process to proceed to Step S29. On the other hand, in a case in which the position of the target owner and the position of the target baggage are not within the predetermined range, the output control unit 15 causes the process to proceed to Step S25.

(Step S29)

The output control unit 15 causes the display unit 21 of the mobile terminal 20 to display the position of the target baggage. The mobile terminal 20 may perform AR display with the position of the target baggage being superimposed on an image (through image) captured by the imaging unit 25.

Effects of First Embodiment

According to the first embodiment described above, the information processing device 10 acquires association information IC that is information in which the baggage identification information and the owner identification information are associated with each other, acquires position information of an owner P and position information of baggage 30 that are associated using the association information IC and causes the mobile terminal 20 held by the owner P to display instruction information IM. In accordance with this, the owner P can easily search for his or her baggage. In addition, the owner P can easily search for his or her baggage. As a result, the information processing system 1 can prevent the owner P erroneously receiving baggage 30 of other persons.

In addition, according to the first embodiment, in a case in which a distance between the owner P and the baggage 30 satisfies a predetermined condition, the output control unit 15 causes the mobile terminal 20 held by the target owner P to output information based on the position information of the target baggage, and thus the owner P of the baggage 30 can be made aware of the position of his or her baggage 30 in a case in which the baggage 30 is conveyed near the owner P and is able to be received.

Furthermore, according to the first embodiment, the owner identification information is acquired from the mobile terminal 20 held by the owner P. In other words, the information processing system 1 can easily identify the owner P without requiring biometric authentication such as face authentication. In addition, in a case in which the owner identification information is acquired from the mobile terminal 20 held by the owner P, a substitute such as a family member can receive the baggage 30 in place of the owner P.

Second Embodiment

Figure 7:
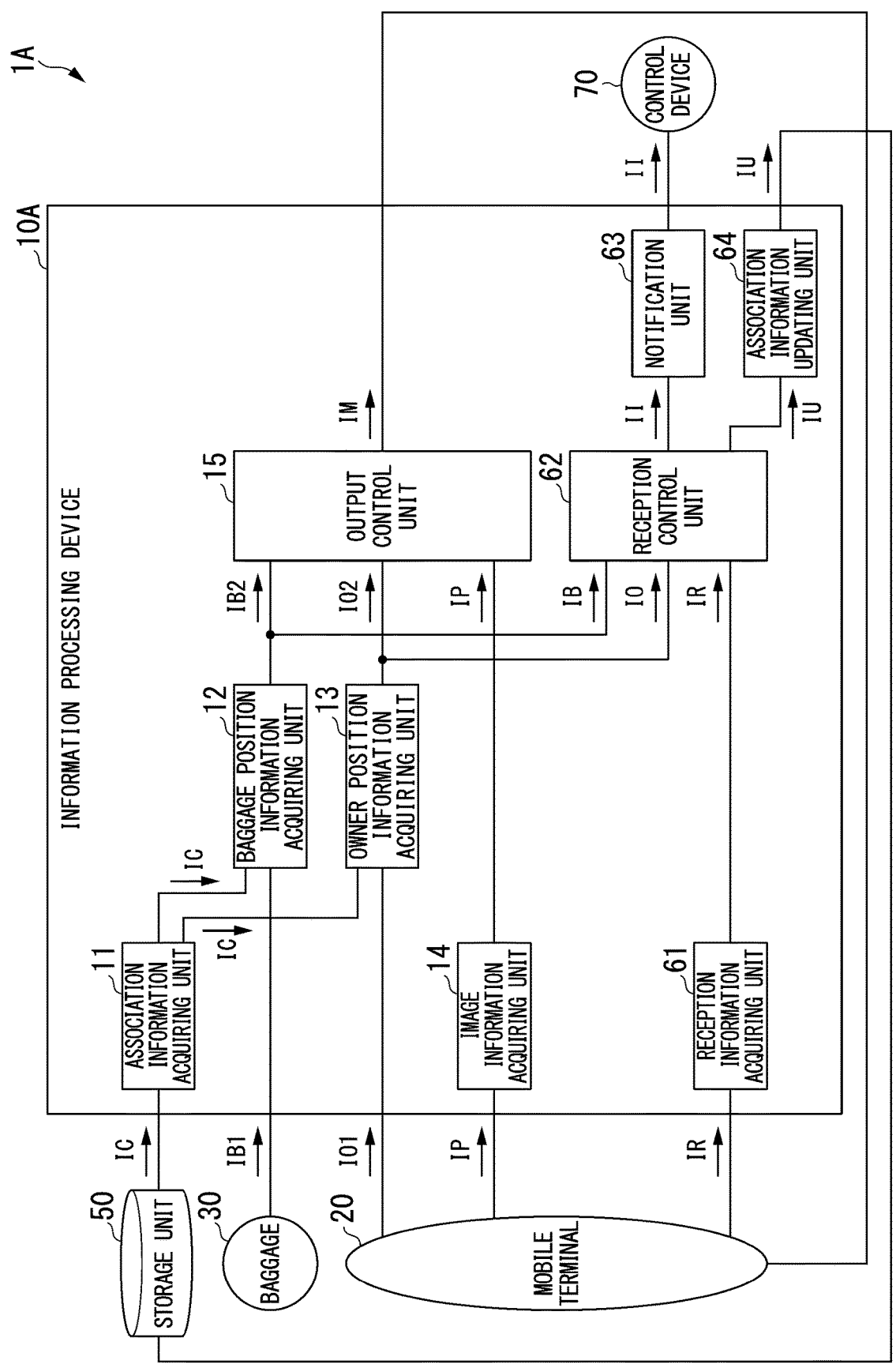
FIG. 7 is a diagram illustrating an example of the functional configuration of an information processing device according to a second embodiment.

FIG. 7 is a diagram illustrating an example of the functional configuration of an information processing device 10A according to a second embodiment. The functional configuration of the information processing device 10A will be described with reference to the drawing. The information processing device 10A includes a reception information acquiring unit 61, a reception control unit 62, a notification unit 63, and an association information updating unit 64, which is different from the information processing device 10. The same reference signs as those illustrated in FIG. 2 are assigned to the same components as those of the information processing device 10, and thus description thereof may be omitted.

The reception information acquiring unit 61 acquires acquisition information IR from a mobile terminal 20. The reception information IR is information that represents that an owner P has received baggage 30. For example, when the mobile terminal 20 detects that the owner P has received baggage 30 by being operated by the owner P, the mobile terminal 20 outputs the reception information IR to the information processing device 10A. The reception information acquiring unit 61 provides the acquired reception information IR for the reception control unit 62.

The reception control unit 62 acquires reception information IR from the reception information acquiring unit 61. In accordance with acquisition of the reception information IR, the reception control unit 62 outputs update information IU including information for updating the storage unit 50 in a case in which the owner P receives baggage 30. The association information updating unit 64 updates the storage unit 50 in which association information IC is stored on the basis of the reception information IR acquired by the reception information acquiring unit 61. The association information updating unit 64 updates the storage unit 50 in accordance with acquisition of the update information IU. More specifically, the association information updating unit 64 sets baggage identification information and owner identification information represented in the update information IU in association information IC stored in the storage unit 50 to a reception completed state. The association information updating unit 64 may be configured to delete baggage identification information and owner identification information represented in the update information IU from the storage unit 50.

The reception control unit 62 acquires baggage information IB from the baggage position information acquiring unit 12 and acquires owner information IO from the owner position information acquiring unit 13. In a case in which there is baggage 30 that has not been received by the owner P for a predetermined time or more, the reception control unit 62 outputs notification information II to the notification unit 63. When the notification information II is acquired from the reception control unit 62, the notification unit 63 notifies the control device 70 of the notification information II. When the notification information II is acquired, the control device 70 performs a predetermined procedure such as notification to a relating staff member. In addition, the reception control unit 62 may determine whether or not reception has been performed by acquiring association information IC from the association information acquiring unit 11.

Figure 8:
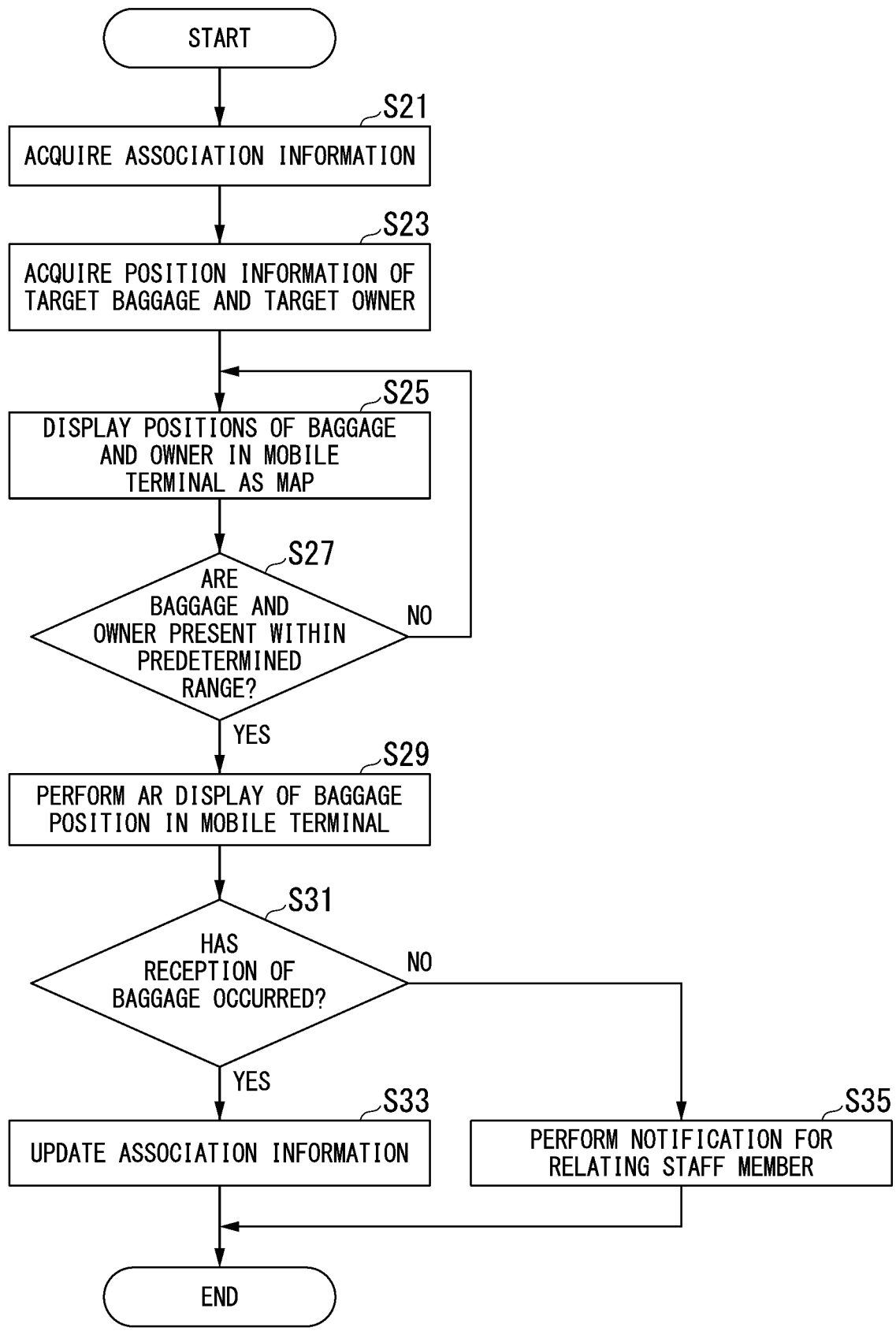
FIG. 8 is a diagram illustrating an example of the flow of a process of the information processing device according to the second embodiment.

FIG. 8 is a diagram illustrating an example of the flow of the process of the information processing device 10A according to the second embodiment. The example of the flow of the process of the information processing device 10A will be described with reference to the drawing. The same reference signs as those illustrated in FIG. 6 are assigned to the same operations described with reference to FIG. 6, and thus description thereof may be omitted.

(Step S31)

The reception control unit 62 determines whether or not reception of baggage 30 has occurred. In a case in which reception information IR has been acquired from the reception information acquiring unit 61, the reception control unit 62 determines that reception of the baggage 30 has occurred, and the process is caused to proceed to Step S33. In a case in which reception information IR has not been acquired from the mobile terminal 20 within a predetermined period after acquisition of the baggage information IB or the owner information IO, the reception control unit 62 determines that the baggage 30 has not been received, and the process is caused to proceed to Step S35.

(Step S33)

The association information updating unit 64 updates the storage unit 50 on the basis of the baggage identification information representing baggage 30 that has been received and owner identification information representing an owner P of the baggage.

(Step S35)

The notification unit 63 notifies the control device 70 of information including the baggage identification information representing baggage 30 that has not been received and owner identification information representing the owner P of the baggage as notification information II. The control device 70 performs a predetermined procedure such as notification of the information to a relating staff member.

Effect of Second Embodiment

According to the second embodiment described above, the information processing device 10A further includes the reception information acquiring unit 61 and the association information updating unit 64. The information processing device 10A updates the association information IC stored in the storage unit 50 on the basis of the reception information IR acquired by the reception information acquiring unit 61. In other words, the information processing device 10A can acquire information indicating whether or not reception has been completed. The information processing device 10A can notify of information of baggage that has not been received.

Third Embodiment

Figure 9:
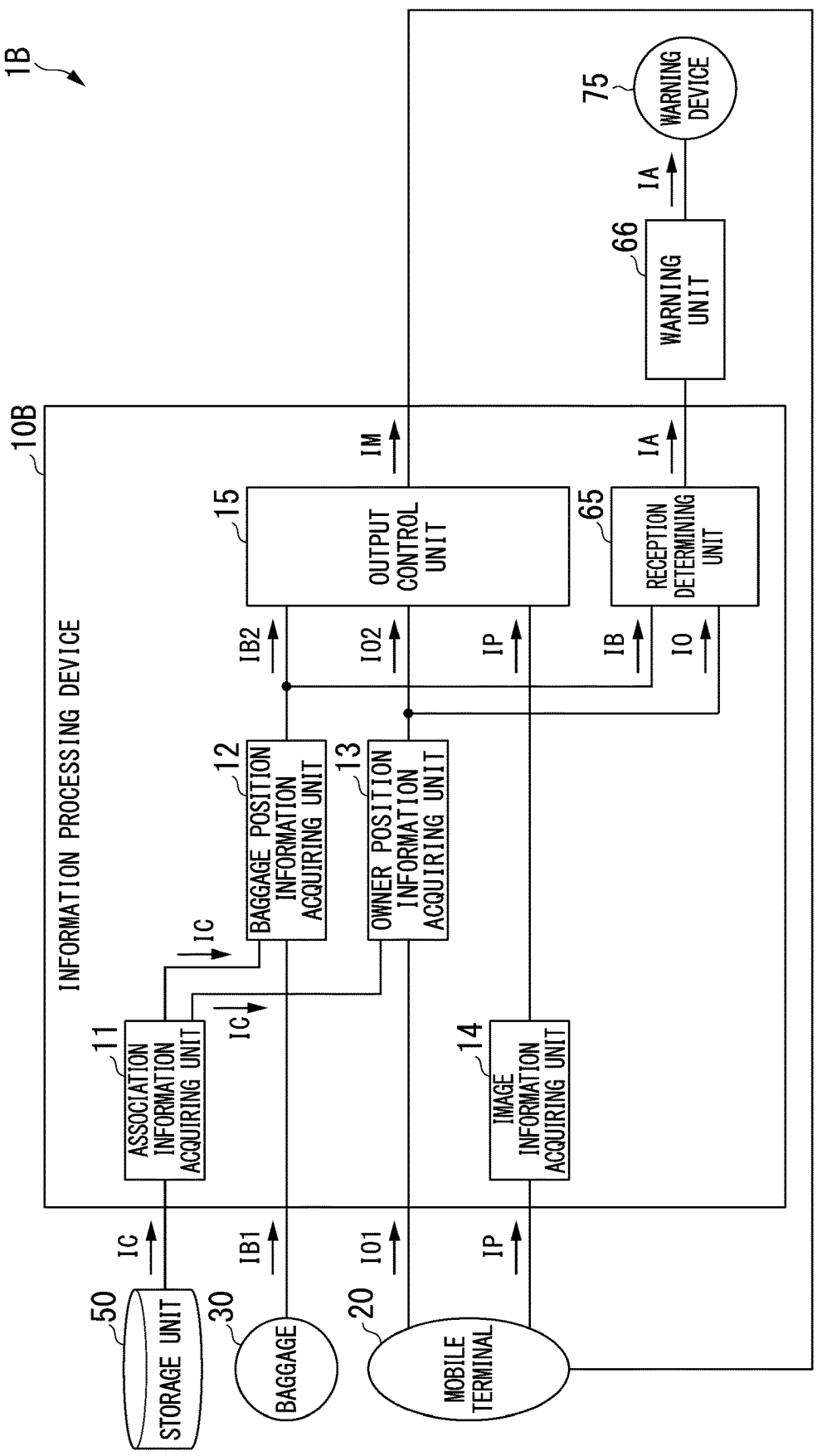
FIG. 9 is a diagram illustrating an example of the functional configuration of an information processing device according to a third embodiment.

FIG. 9 is a diagram illustrating an example of the functional configuration of an information processing device 10B according to a third embodiment. The functional configuration of the information processing device 10B will be described with reference to the drawing. The information processing device 10B includes a reception determining unit 65 and a warning unit 66, which is different from the information processing device 10. The same reference signs as those illustrated in FIG. 2 are assigned to the same components as those of the information processing device 10, and thus description thereof may be omitted.

The reception determining unit 65 acquires baggage information IB from a baggage position information acquiring unit 12 and acquires owner information IO from an owner position information acquiring unit 13. The reception determining unit 65 determines whether or not target baggage represented in the baggage information IB and a target owner, who has received the target baggage, represented in the owner information IO coincide with information associated in accordance with association information IC. In a case in which the target baggage and the target owner do not coincide with the information associated in accordance with the association information IC, the reception determining unit 65 outputs warning information IA to the warning unit 66.

The warning unit 66 outputs the warning information IA to the warning device 75. In other words, in a case in which the reception determining unit 65 determines that the target baggage and the target owner do not coincide with the information associated in accordance with the association information IC, the warning unit 66 causes the warning device 75 to issue a warning. For example, the warning device 75 is attached to a baggage claim of an airport. The warning device 75 issues a warning indicating that specific baggage 30 has been received by another person using a predetermined method such as sounding a warning.

Figure 10:
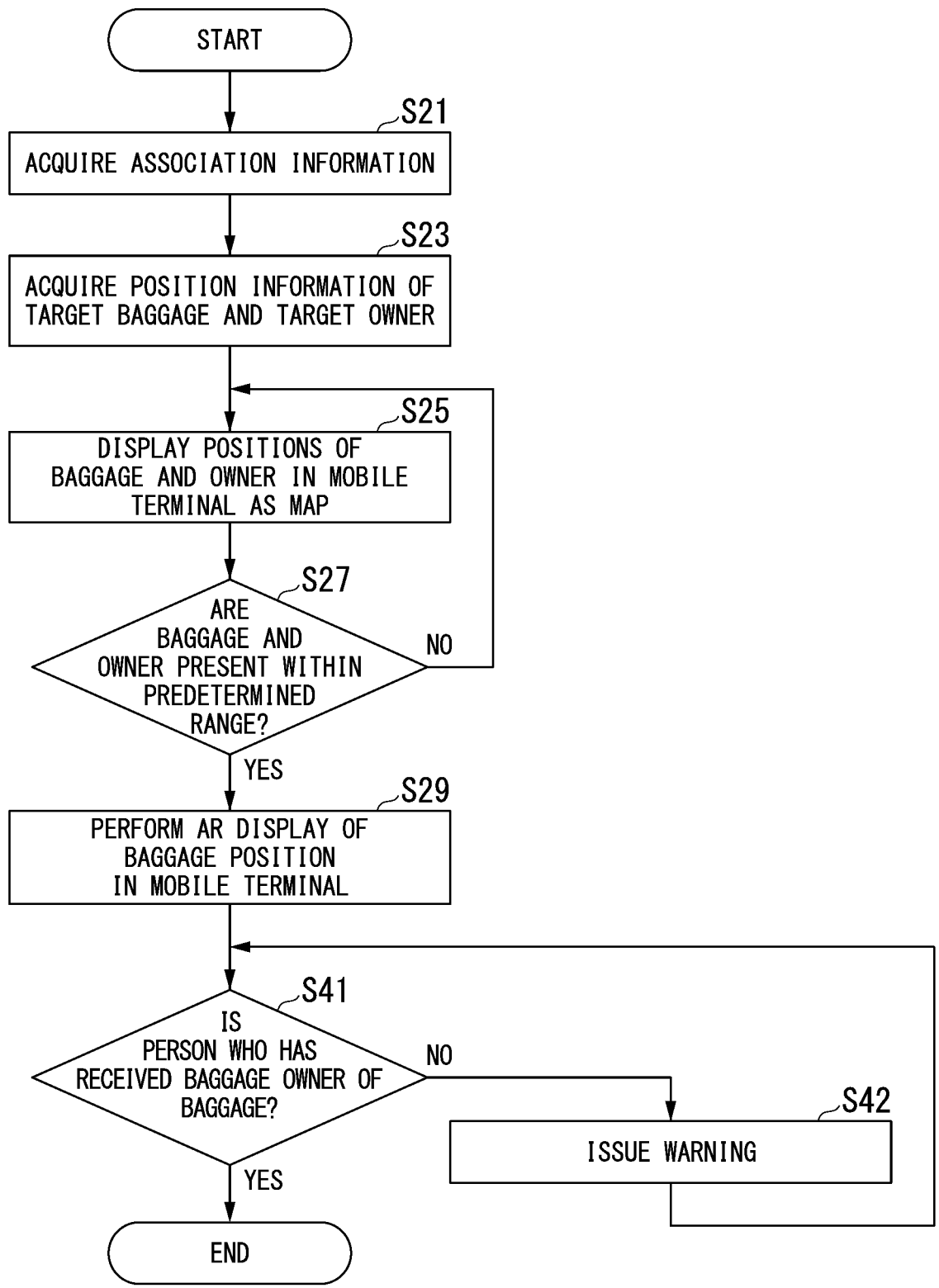
FIG. 10 is a diagram illustrating an example of the flow of a process of the information processing device according to the third embodiment.

FIG. 10 is a diagram illustrating an example of the flow of a process of the information processing device 10B according to the third embodiment. The example of the flow of the process of the information processing device 10B will be described with reference to the drawing. The same reference signs as those illustrated in FIG. 6 are assigned to the same operations described with reference to FIG. 6, and thus description thereof may be omitted.

(Step S41)

The reception determining unit 65 determines whether or not a combination of baggage 30 and a person who has received the baggage 30 coincide with a combination of target baggage and a target owner associated with the target baggage in accordance with association information IC. The reception determining unit 65 ends the process in the case of coincidence of the combination of the target owner and the target baggage. In the case of no coincidence of the combination of the target owner and the target baggage, the reception determining unit 65 causes the process to proceed to Step S42.

(Step S42)

In the case of no coincidence of the combination of the target owner and the target baggage, the warning unit 66 causes the warning device 75 to issue a warning. After causing the warning device 75 to issue a warning, the warning unit 66 causes the process to proceed to Step S41.

Effect of Third Embodiment

In addition, according to the embodiment described above, the information processing device 10B further includes the reception determining unit 65 and determines whether or not the owner P and the baggage 30 associated in accordance with the association information IC coincide with each other. In a case in which the owner P and the baggage 30 associated in accordance with the association information IC do not coincide with each other, the information processing device 10B issues a warning. In other words, according to the information processing device 10B, misidentification of baggage can be inhibited.

Fourth Embodiment

Figure 11:
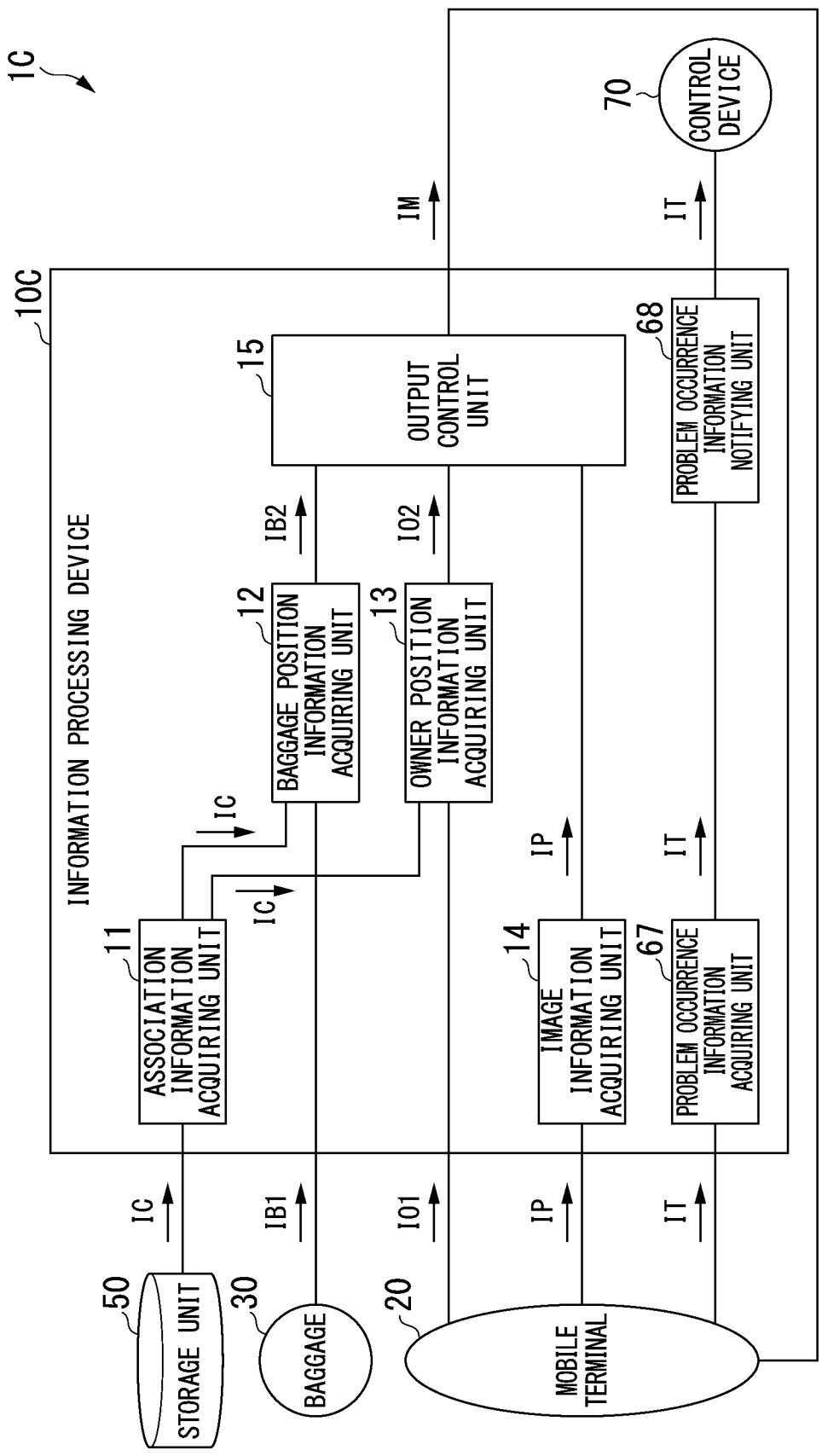
FIG. 11 is a diagram illustrating an example of the functional configuration of an information processing device according to a fourth embodiment.

FIG. 11 is a diagram illustrating an example of the functional configuration of an information processing device 10C according to a fourth embodiment. The functional configuration of the information processing device 10C will be described with reference to the drawing. The information processing device 10C includes a problem occurrence information acquiring unit 67 and a problem occurrence information notifying unit 68, which is different from the information processing device 10. The same reference signs as those illustrated in FIG. 2 are assigned to the same components as those of the information processing device 10, and thus description thereof may be omitted.

The problem occurrence information acquiring unit 67 acquires problem occurrence information IT transmitted by a mobile terminal 20. The problem occurrence information IT is information that indicates that a certain problem has occurred when an owner P receives baggage 30.

For example, when it is detected that a certain problem has occurred in accordance with an operation performed by an owner P, the mobile terminal 20 outputs problem occurrence information IT to the information processing device 10C.

In a case in which the problem occurrence information acquiring unit 67 acquires the problem occurrence information IT, the problem occurrence information notifying unit 68 notifies a control device 70 thereof.

Figure 12:
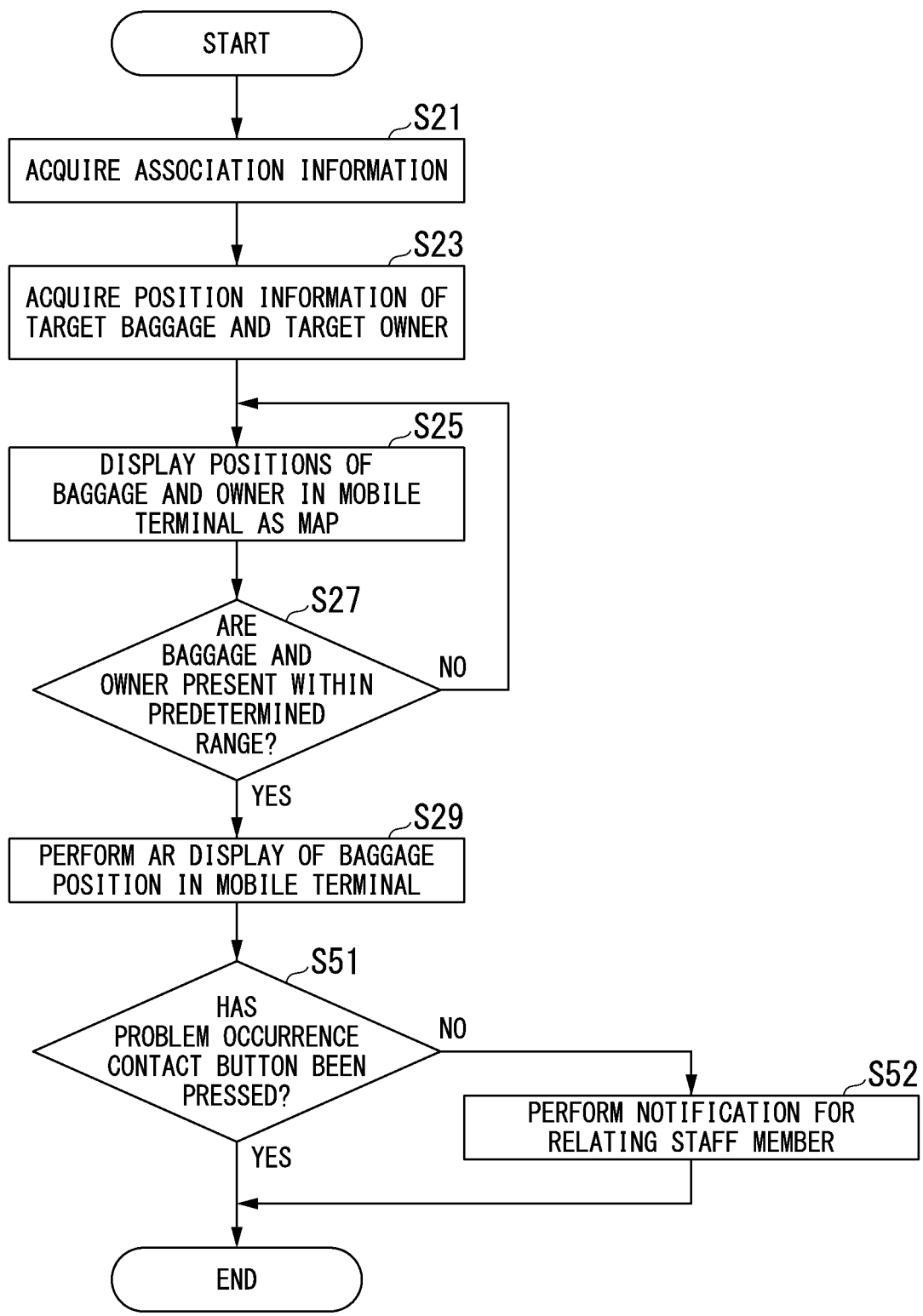
FIG. 12 is a diagram illustrating an example of the flow of a process of the information processing device according to the fourth embodiment.

FIG. 12 is a diagram illustrating an example of the flow of a process of the information processing device 10C according to the fourth embodiment. The example of the flow of the process of the information processing device 10C will be described with reference to the drawing. The same reference signs as those illustrated in FIG. 6 are assigned to the same operations described with reference to FIG. 6, and thus description thereof may be omitted.

(Step S51)

By acquiring problem occurrence information IT, the problem occurrence information acquiring unit 67 detects that a certain problem has occurred in an owner P owning a mobile terminal 20. For example, the mobile terminal 20 may include a problem occurrence contact button not illustrated in the drawing and notify the information processing device 10C of an occurrence of a problem. In a case in which the problem occurrence information IT has been acquired, the problem occurrence information acquiring unit 67 causes the process to proceed to Step S52. In a case in which the problem occurrence information IT has not been acquired, the problem occurrence information acquiring unit 67 ends the process.

(Step S52)

On the other hand, in a case in which the problem occurrence information IT has been acquired, the problem occurrence information acquiring unit 67 notifies a relating staff member thereof. More specifically, the problem occurrence information notifying unit 68 may notify of an occurrence of a problem by outputting the problem occurrence information IT to the control device 70. The control device 70 performs a predetermined procedure such as notification of the information to a relating staff member.

Effect of Fourth Embodiment

According to the embodiment described above, the information processing device 10C further includes the problem occurrence information acquiring unit 67. In a case in which a problem has occurred on the basis of the problem occurrence information IT acquired by the problem occurrence information acquiring unit 67, the information processing device 10C notifies a relating staff member or the like through the control device 70. In other words, the information processing device 10C can notify a relating staff member or the like of various problems that have occurred in the owner P.

Example of Case in which Plurality of Pieces of Baggage 30 are Associated with Owner P FIG. 13 is a diagram illustrating association information IC1 according to this embodiment. An example of a case in which a plurality of pieces of baggage 30 are associated with an owner P will be described with reference to the drawing. The association information IC1 is a modified example of the association information IC. In the association information IC1, a plurality of pieces of baggage identification information are associated with one piece of owner identification information, which is different from the association information IC.

More specifically, in the example illustrated in the drawing, baggage identification information "B0002-1" and baggage identification information "B0002-2" are associated with owner identification information "P0002". In other words, target baggage represented using the baggage identification information "B0002-1" and target baggage represented using the baggage identification information "B0002-2" are associated with a target owner represented using the owner identification information "P0002". In other words, in this example, the owner identification information is associated with a plurality of pieces of baggage identification information.

By associating a plurality of pieces of baggage identification information with one piece of owner identification information, an owner P can leave a plurality of pieces of baggage 30, and the information processing device 10 can indicate that the plurality of pieces of baggage 30 is baggage owned by the owner P who is one person. In other words, even in a case in which a plurality of pieces of baggage 30 is left by an owner P, the information processing device 10 can indicate the positions of the baggage 30.

Figure 14:
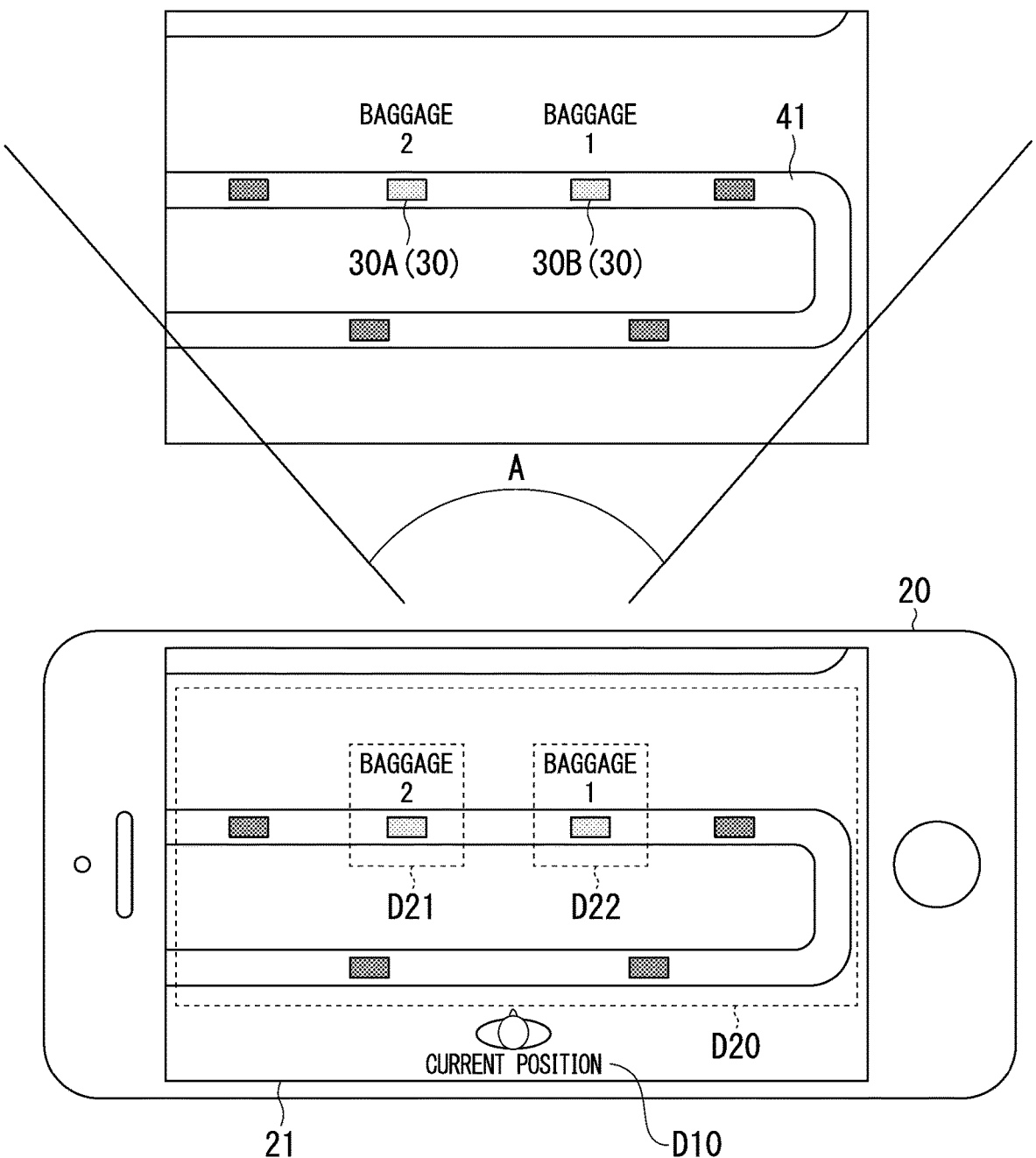
FIG. 14 is a diagram illustrating an example of a screen configuration displayed by a mobile terminal according to this embodiment.

FIG. 14 is a diagram illustrating an example of a screen configuration displayed by a mobile terminal 20 according to this embodiment. The example of the screen configuration displayed by the mobile terminal 20 will be described with reference to the drawing. The display unit 21 included in the mobile terminal 20 includes a current position display section D10 and a baggage information display section D20 as constituent elements of the screen. The current position display section D10 displays the current position of the owner P. The baggage information display section D20 displays the position of baggage 30 of the owner P. For example, the display unit 21 displays an image that is captured with an image angle A by the imaging unit 25 and displays the positions of baggage 30 associated with the owner P with being superimposed thereon.

In the example illustrated in the drawing, a case in which baggage 30A and baggage 30B are associated with an owner P will be described. In this example, the display unit 21 may display information indicating baggage owned by the owner P in an owned baggage display section D21 and an owned baggage display section D22. In addition, the display unit 21 may display distance information between baggage 30 and an owner P and information of a time required for the baggage 30 to be conveyed near the owner P by the baggage conveying belt 41 and the like.

Example of Mobile Terminal 20

Figures 15A, 15B:
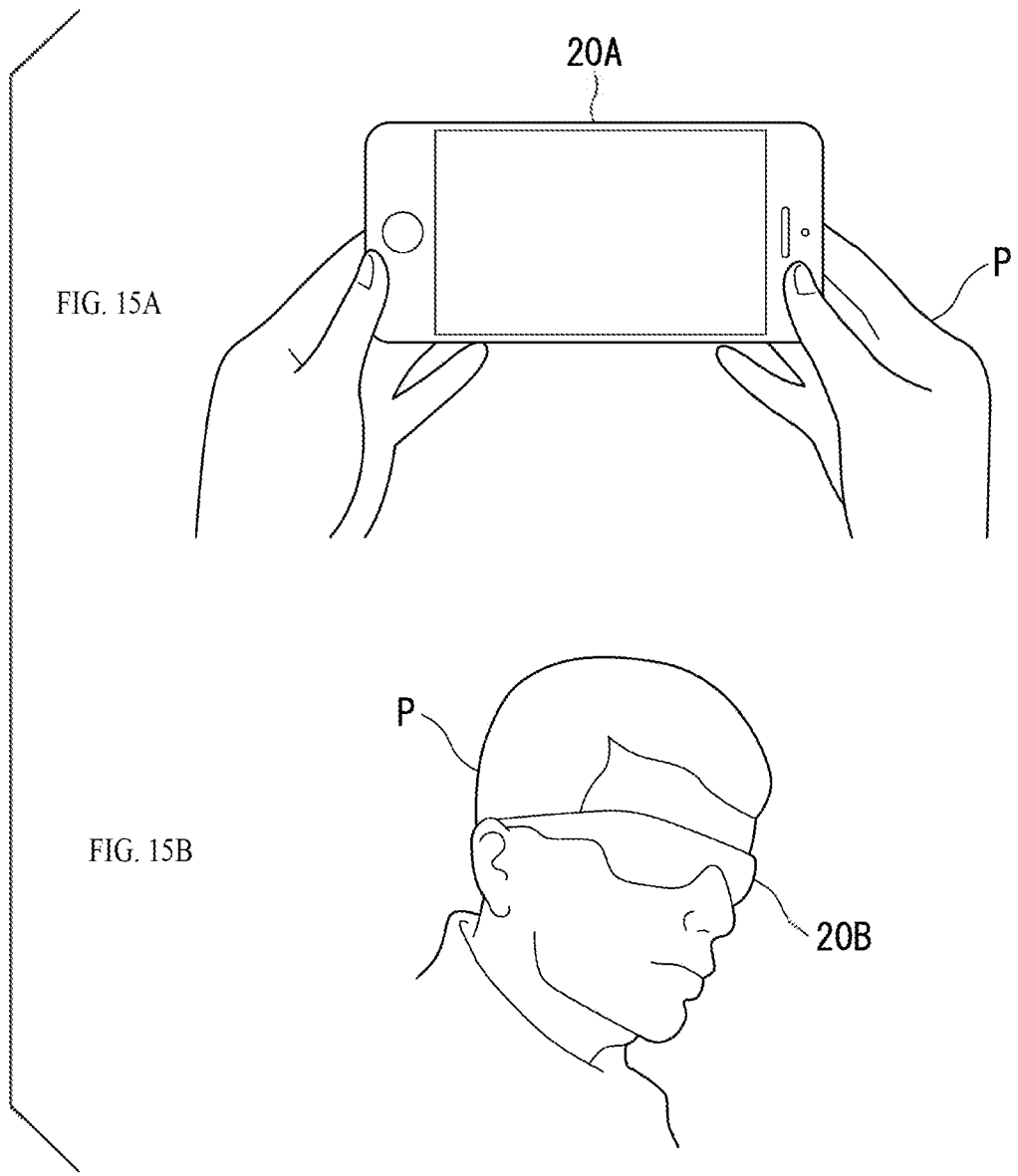
FIGS. 15A and 15B are diagrams illustrating examples of a mobile terminal according to this embodiment.

FIGS. 15A and 15B are diagrams illustrating examples of the mobile terminal 20 according to this embodiment. FIG. 15A is a diagram illustrating an example of a case in which the mobile terminal 20 is a smartphone 20A. FIG. 15B is a diagram illustrating an example of a case in which the mobile terminal 20 is smart glasses 20B. As illustrated in FIG. 15A, the smartphone 20A is used with being held by an owner P. As illustrated in FIG. 15B, the smart glasses 20B are used with being worn by an owner P.

In a case in which the smart glasses 20B are used as an example of the mobile terminal 20, for example, the information processing system 1 can be also applied to a belt conveyer operation of a distribution industry or the like. In this case, first identification information is conveying object identification information used for identifying a conveying object in place of baggage 30. Second identification information is operator identification information used for identifying an operator to receive a conveying object identified by conveying object identification information. The conveying object identification information and the operator identification information are associated with association information. A first position information acquiring unit acquires position information of a target conveying object that is a conveying object identified by the conveying object identification information included in the association information.

An output control unit outputs information based on the position information of the target conveying object to the smart glasses worn by a target operator who is an operator to receive a conveying object identified by the operator identification information associated with the conveying object identification information relating to the target conveying object in the association information.

In a case in which the information processing system 1 is applied also to a belt conveying operation of a distribution industry or the like, an operator can be supported. Conventionally, in a case in which a conveying object conveyed by a belt conveyer is received by an operator, there are cases in which the operator misidentifies target baggage. In such cases, by supporting the operation using the information processing system 1, an operator's misidentification of a target conveying object can be inhibited.

Example of Case in which Plurality of Operators W are Associated with Conveying Object O FIG. 16A to 16C are diagrams illustrating examples of a case in which the information processing system 1 according to this embodiment is applied to a belt conveyer operation of a distribution industry or the like. FIG. 16A is a diagram illustrating an example of a case in which the baggage conveying device 40 is applied to a belt conveyer operation of a distribution industry or the like.

A conveying object conveying device 40A is a modified example of the baggage conveying device 40. The conveying object conveying device 40A includes a conveying object conveying belt 41A and an identification information reading device 42A. The conveying object conveying belt 41A is a modified example of the baggage conveying belt 41, and the identification information reading device 42A is a modified example of the identification information reading device 42. The conveying object conveying belt 41A conveys conveying objects O (conveying objects O1 to O3), and the identification information reading device 42A acquires identification information attached to the conveying objects O. The conveying objects O are examples of baggage 30.

FIG. 16B is a diagram illustrating an example of a case in which a plurality of operators W receive conveying objects O. In the example illustrated in the drawing, operators W of operator W1 to operator W4 receive baggage. Here, for a belt conveyer operation of a distribution industry or the like, there are cases in which operators W form one group from a plurality of operators W and perform an operation in units of groups. In a case in which one group is formed from a plurality of operators W, and an operation is performed in units of groups, there are cases in which there are also a plurality of operators W to receive a target conveying object O.

Figures 17, 18:
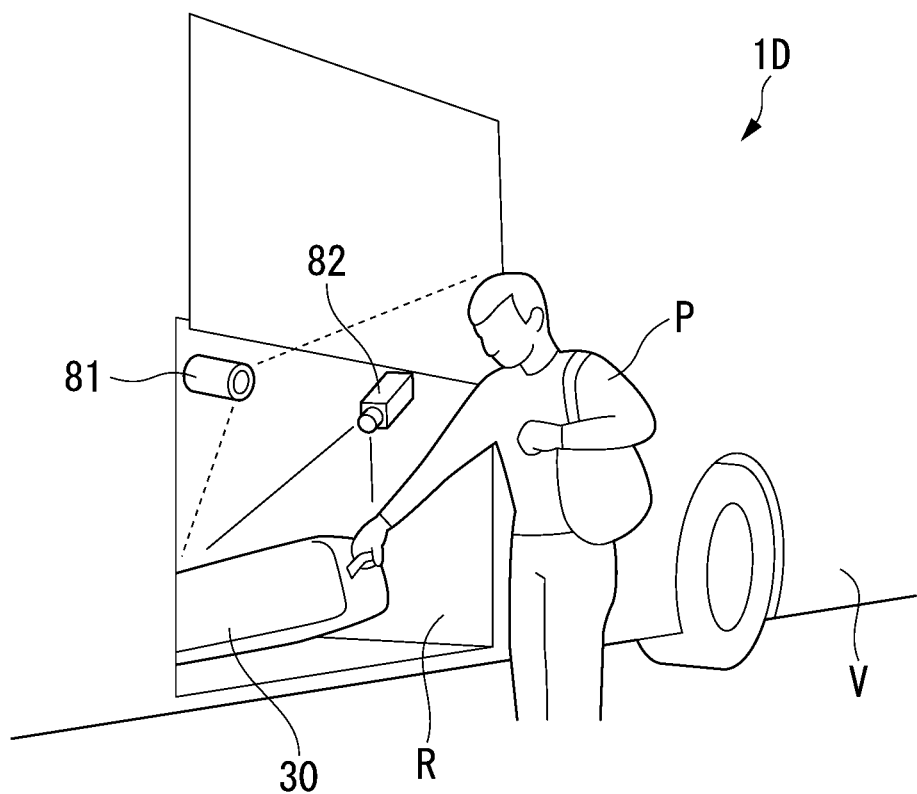
FIG. 17 is a diagram illustrating a second modified example of the association information according to this embodiment.
FIG. 18 is a diagram illustrating an example of use of an information processing system according to this embodiment in a vehicle.

FIG. 17 is a diagram illustrating a second modified example of the association information IC according to this embodiment. Association information IC2 is a modified example of the association information IC in a case in which an operation is performed by forming one group from a plurality of operators W. In the example illustrated in the drawing, conveying object identification information "B0002" is associated with operator identification information "P0002-1" and operator identification information "P0002-2". In other words, an operator represented by the operator identification information "P0002-1" and an operator represented by the operator identification information "P0002-2" are associated with a conveying object O represented by the conveying object identification information "B0002". In other words, in this example, operator identification information is associated with a plurality of pieces of conveying object identification information. In addition, the association information IC2 may associate other information relating to the conveying object O. For example, other information relating to the conveying object O is information relating to operation details using the conveying object O.

Referring back to FIGS. 16A to 16C, FIG. 16C is a diagram illustrating an example of display of the smart glasses 20B. A screen configuration D1 is a diagram illustrating an example of the screen configuration displayed in the smart glasses 20B. The smart glasses 20B specify and display a target conveying object O that is associated with the smart glasses 20B in accordance with the association information IC2 among a plurality of conveying objects O that are being conveyed by the conveying object conveying belt 41A. For example, in the screen configuration D1, a target conveying object O is specified using a marker D11, and the target conveying object O is displayed in an emphasized manner. In addition, the smart glasses 20B may display information relating to operation details associated with the association information IC2 in an operation contents display section D12. The information relating to operation details are unpacking, packing object checking, packing, and the like.

In addition, in the smartphone 20A and the smart glasses 20B, an application program configuring a function of the information processing system 1 may be installed, and a similar function may be configured through a predetermined internet browser.

Example of Use of Information Processing System 1

Figure 19:
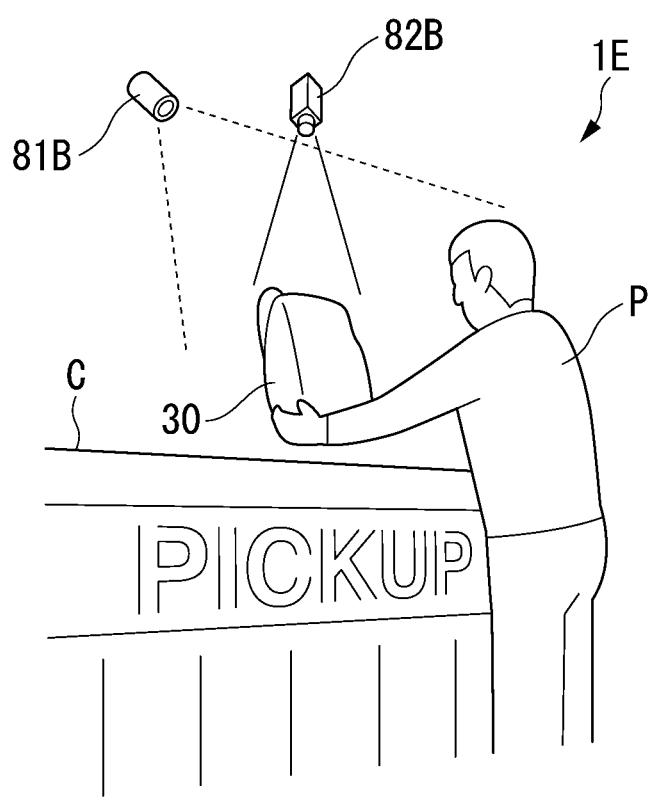
FIG. 19 is a diagram illustrating an example of use of an information processing system according to this embodiment in a cloakroom.

FIGS. 18 and 19 are diagrams illustrating examples of the use of the information processing system 1 according to this embodiment. The information processing system 1 is used in a case in which an owner P of baggage 30 searches for his or her baggage from among a plurality of pieces of baggage and receives his or her found baggage. An example of a case in which the information processing system 1 is used will be described with reference to FIGS. 18 and 19.

FIG. 18 is a diagram illustrating an example of a case in which the information processing system 1D according to this embodiment is used in a vehicle. The information processing system 1D is an example of the information processing system 1. Here, there are cases in which an owner P leaves baggage 30 in a vehicle V. For example, the vehicle V is an express route bus, a limousine bus, a long-distance bus, a tour bus, a night bus, or the like. In such a case, the owner P leaves baggage 30 in a baggage housing space R included in the vehicle V. In this example, the information processing system 1D includes an imaging unit 81 and a projector 82 in the baggage housing space R.

When the owner P leaves the baggage 30, the imaging unit 81 captures an image of the owner P and the baggage 30 and acquires baggage identification information and owner identification information. The imaging unit 81 stores the baggage identification information and the owner identification information as second identification information, which have been acquired, in the storage unit 50 as association information IC. When the owner P receives the baggage 30, the imaging unit 81 captures an image of the owner P and acquires owner identification information. The projector 82 projects an image onto baggage associated with the association information IC. The owner P receives the baggage onto which the image is projected. The vehicle V may be an electric train or the like.

FIG. 19 is a diagram illustrating an example of a case in which an information processing system 1E according to this embodiment is used in a cloakroom. The information processing system 1E is an example of the information processing system 1. Here, there are cases in which an owner P leaves baggage 30 in various service counters C. The service counters C, for example, are cloakrooms of hotels or the like. In a case in which the service counter C is a cloakroom of a hotel, baggage 30 may be clothes or the like. In this example, the information processing system 1E includes an imaging unit 81B and a projector 82B at a service counter C.

When the owner P leaves the baggage 30, the imaging unit 81B captures an image of the owner P and the baggage 30 and acquires baggage identification information and owner identification information. The imaging unit 81B stores the baggage identification information and the owner identification information, which have been acquired, in the storage unit 50 as association information IC. When the owner P receives the baggage 30, the imaging unit 81B captures an image of the owner P and acquires owner identification information. The projector 82B projects an image onto baggage associated with the association information IC. The owner P receives the baggage onto which the image is projected. In this example, although a case in which the service counter C is the cloakroom of the hotel has been described, the information processing system 1E may be broadly used in facilities providing various services such as restaurants.

According to at least one of the embodiments described above, by including the association information acquiring unit, the first position information acquiring unit, and the output control unit, reception of own baggage among a plurality of pieces of baggage that are being conveyed can be supported.

While several embodiments of the invention have been described and illustrated above, it should be understood that such embodiments are presented as examples and are not intended to limit the scope of the invention. These embodiments can be performed in other various forms, and various omissions, substitutions, and modifications can be made in a range not departing from the concept of the present invention. Like these embodiments and modifications thereof belong to the scope and the concept of the invention, they belong to the scope of inventions described in the claims and equivalencies thereof.

What is claimed is:

1. An information processing device comprising:
   an association information acquiring unit configured to acquire association information in which first identification information used for identifying baggage and second identification information used for identifying an owner of baggage identified by the first identification information are associated with each other;
   a first position information acquiring unit configured to acquire position information of target baggage that is baggage identified by the first identification information included in the association information;
   a second position information acquiring unit configured to acquire position information of a target owner who is an owner of the baggage from a mobile terminal held by the target owner; and
   an output control unit configured to cause the mobile terminal held by the target owner who is an owner of the baggage identified by the second identification information associated with the first identification information relating to the target baggage in the association information to output information based on the position information of the target baggage,
   wherein, in a case in which the distance between a position represented by the position information of the target owner and a position represented by the position information of the target baggage is within a predetermined distance, the output control unit causes the mobile terminal held by the target owner to output information based on the position information of the target baggage.

2. The information processing device according to claim 1, wherein the output control unit causes the mobile terminal held by the target owner to output information based on the position information of the target baggage in a condition that a position represented by the position information of the target owner is within a predetermined distance from a pickup location of the baggage.

3. The information processing device according to claim 1, wherein the second identification information is information used for identifying the mobile terminal held by the owner.

4. The information processing device according to claim 1, further comprising:
   a reception information acquiring unit configured to acquire reception information representing that the target baggage has been received by the target owner; and
   an association information updating unit configured to update the association information on the basis of the reception information acquired by the reception information acquiring unit.

5. The information processing device according to claim 1, further comprising:
   a reception determining unit configured to determine whether or not the target baggage and the target owner who has received the target baggage coincide with information associated by the association information; and
   a warning unit that causes a warning device to issue a warning in a case in which the reception determining unit determines non-coincidence.

6. The information processing device according to claim 1, further comprising:
   a problem occurrence information acquiring unit configured to acquire problem occurrence information transmitted by the mobile terminal; and
   a notification unit configured to perform notification for a predetermined control device in a case in which the problem occurrence information acquiring unit acquires the problem occurrence information.

7. The information processing device according to claim 1, wherein there are cases in which the second identification information is associated with a plurality of pieces of the first identification information.

8. An information processing system comprising:
   the information processing device according to claim 1; and
   the mobile terminal held by the target owner.

9. A computer-readable non-transitory storage medium storing thereon a program causing a computer to execute:
   acquiring association information in which first identification information used for identifying baggage and second identification information used for identifying an owner of baggage represented by the first identification information are associated with each other;

acquiring position information of baggage identified by the first identification information;

acquiring position information of an owner of baggage from a mobile terminal held by the owner identified by the second identification information; and outputting the position of the baggage acquired in the acquiring of position information of baggage to a mobile terminal held by the owner of the baggage associated by the association information, wherein, in a case in which the distance between a position represented by the position information of the target owner and a position represented by the position information of target baggage is within a predetermined distance, the outputting causes the mobile terminal held by the target owner to output information based on the position information of the target baggage.

10. The information processing device according to claim 1, wherein the first position information acquiring unit extracts one record from the association information, generates a baggage information by adding the first position information of the target baggage to a baggage identification information of the target baggage, and outputs the baggage information to the output control unit;

the second position information acquiring unit extracts one record from the association information, generates an owner information by adding the second position information of the target owner to an owner identification information of the target owner, and outputs the owner information to the output control unit; and the output control unit outputs information based on the baggage information and the owner information.

11. The information processing device according to claim 1, wherein the position information uniquely identifies position coordinates using two-dimensional coordinates.

12. An information processing device comprising:

an association information acquiring unit configured to acquire association information in which first identification information used for identifying a conveying object and second identification information used for identifying an operator to receive the conveying object identified by the first identification information are associated with each other;

a first position information acquiring unit configured to acquire position information of a target conveying object that is a conveying object identified by the first identification information included in the association information; and an output control unit configured to cause smart glasses worn by a target operator who is an operator to receive a conveying object identified by the second identification information associated with the first identification information relating to the target conveying object in the association information to output information based on the position information of the target conveying object.

13. The information processing device according to claim 12, wherein there are cases in which the first identification information is associated with a plurality of pieces of the second identification information in the association information.

14. An information processing system comprising:

the information processing device according to claim 1; and the program according to claim 9.

* * * * *